United States Patent [19]
Bass et al.

[11] Patent Number: 5,210,104
[45] Date of Patent: May 11, 1993

[54] PROCESS FOR PREPARING LOW DENSITY POROUS CROSSLINKED POLYMERIC MATERIALS

[75] Inventors: Ronald M. Bass; Thomas F. Brownscombe, both of Houston, Tex.

[73] Assignee: Shell Oil Company, Houston, Tex.

[21] Appl. No.: 961,603

[22] Filed: Oct. 15, 1992

[51] Int. Cl.$^5$ ................................................ C08J 9/28
[52] U.S. Cl. ..................................... 521/64; 521/146; 521/147; 521/148; 521/149; 521/150
[58] Field of Search ................ 521/64, 146, 147, 148, 521/149, 150

[56] References Cited

U.S. PATENT DOCUMENTS

| | | |
|---|---|---|
| 3,565,817 | 8/1968 | Lissant .................. 252/310 |
| 3,992,333 | 11/1976 | Emmons et al. . |
| 4,522,953 | 6/1985 | Barby et al. . |
| 4,668,709 | 5/1987 | Jones et al. . |
| 4,788,225 | 11/1988 | Edwards et al. . |
| 5,037,859 | 8/1991 | Williams, Jr. et al. . |
| 5,147,345 | 9/1992 | Young et al. . |
| 5,149,720 | 9/1992 | DesMarais et al. .................. 521/63 |

OTHER PUBLICATIONS

Copending Application Ser. No. 870,858, filed Apr. 20, 1992.
Copending Application Ser. No. 891,322, filed May 29, 1992.
Heening Winter, Encyclopedia of Polymer Science & Engineering, "Gel Point", 1989.
H. H. Winter, Polymer Engineering And Science, V. 27, #22, p. 1698 (1987).

*Primary Examiner*—Morton Foelak

[57] ABSTRACT

A process for the production of a stable curable water-in-oil high internal phase emulsion containing monomers as the continuous phase is provided by adding an initiator subsequent to formation of a water-in-oil high internal phase emulsion. The process forms uniform stable water-in-oil high internal phase emulsions in a continuous mixing process. These curable water-in-oil high internal phase emulsions are useful for the preparation of low density porous crosslinked polymeric materials.

20 Claims, No Drawings

PROCESS FOR PREPARING LOW DENSITY POROUS CROSSLINKED POLYMERIC MATERIALS

FIELD OF INVENTION

This invention relates to the preparation of low density, porous, crosslinked, polymeric materials. In one aspect, the invention relates to a process for the preparation of curable water-in-oil high internal phase emulsions for the production of low density, porous, crosslinked, polymeric materials.

BACKGROUND OF THE INVENTION

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase.

Such high absorption capacity, low density foams are prepared in U.S. Pat. No. 4,522,953 by forming, in batches, high internal phase water-in-oil emulsions containing monomers in the continuous phase of the emulsion and polymerization initiators, and subsequently curing the emulsions at a temperature around 60° C. for about 8 hours. Typically, to form the water-in-oil high internal phase emulsion, an aqueous solution of potassium persulfate initiator is added slowly to a container containing the stirred monomers and emulsifiers.

However, to produce larger quantities of the low density, porous, crosslinked, polymeric materials it is desirable to have a continuous mixing process to produce the emulsion. It is desirable to have a continuous mixing process with minimal process difficulties such as clogging of orifices or build-up of material on walls in the mixing vessel. Further, the resulting emulsions should be uniform and stable to produce reproducible foams. It is even desirable to avoid build-up of material on walls and mixer heads in the mixing vessel in a batch process.

It is therefore an object of the present invention to provide an improved mixing process to produce curable high internal phase emulsions.

SUMMARY OF THE INVENTION

According to the invention, a process for the production of a porous crosslinked polymeric material is provided, comprising the steps of:

(a) providing an aqueous stream comprising water and an electrolyte;

(b) providing a monomer stream comprising a mixture of polymerizable monomers comprising at least one vinyl monomer and from about 2 to about 70 weight percent, based on the mixture, of a difunctional unsaturated crosslinking monomer;

(c) providing a surfactant to the aqueous stream, the monomer stream, or both the aqueous and monomer stream, (d) combining and mixing said aqueous stream and said monomer stream in a mixing vessel under conditions effective to continuously produce a water-in-oil high internal phase emulsion having at least 90 weight percent, based on the emulsion, of water as the internal phase;

(e) then adding to at least a portion of said water-in-oil high internal phase emulsion an effective amount of a polymerization catalyst to cure the polymerizable monomers thereby producing a curable water-in-oil high internal phase emulsion, and (f) then polymerizing the curable water-in-oil high internal phase emulsion at a temperature of at least about 25° C. for a time effective to cure the monomers.

The clogging of orifices and build-up of material on walls in the mixing vessels and mixing heads are avoided by adding a polymerization catalyst subsequent to formation of a water-in-oil high internal phase emulsion.

DETAILED DESCRIPTION OF THE INVENTION

According to the invention, a curable water-in-oil high internal phase emulsion can be prepared without the disadvantage of clogged mixing vessels and non-uniform emulsions. A low density porous crosslinked polymeric material (hereinafter "foam") having high absorption capacity can be prepared by curing these uniform curable water-in-oil high internal phase emulsions. These foams generally have a dry density of less than about 0.1 g/cc.

Various monomers may be used in the preparation of the foams, provided the monomers can be dispersed in or form an oil phase of a water-in-oil high internal phase emulsion and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene and isoprene; and mixtures thereof.

Suitable crosslinking agents can be any difunctional unsaturated monomers capable of reacting with the vinyl monomers. Difunctional unsaturated crosslinking monomers include, for example, divinyl benzene, diethylene glycol dimethacrylate, 3-butylene dimethacrylate, and allyl methacrylate. Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable polymerization catalysts can be water-soluble or oil-soluble. Water-soluble catalysts include, for example, potassium or sodium persulfate and various redox systems such as ammonium persulfate together with sodium metabisulfite. Oil soluble (monomer soluble) catalysts include, for example, azodibisisobutyronitrile (AIBN), benzoyl peroxide, methyl ethyl ketone peroxide, and di-2-ethyl-hexyl-peroxydicarbonate. The catalyst should be present in an effective amount to polymerize and to cure the monomers. Typically the catalyst can be present from about 0.005 to about 15 weight percent based on the monomers.

The surfactant used in making the high internal phase emulsion which is to be polymerized is also important in forming a water-in-oil high internal phase emulsion. The surfactant can be added to the aqueous phase or monomer phase (monomer mixture) depending on the solubility of the surfactant used. Suitable surfactants include, for example, nonionic surfactants such as sorbitan esters (eg., sorbitan monooleate and sorbitan monolaurate), glycerol esters (eg. glycerol monooleate and glycerol monoricinoleate), PEG 200 dioleate, partial fatty acid esters of polyglycerol, and caster oil 5–10 EO; cationic surfactants such as ammonium salts (eg., distearyl dimethyl ammonium chloride and dioleyl dimethyl ammonium chloride); and anionic surfactants such as bis-tridecyl sulfosuccinic acid salt. Commercially available surfactants include, for example, SPAN ® emulsifying agents 20, 40, 60, 65, 80 and 85 (from Fluka Chemical Corp. or Aldrich Chemical Co.), EMSORB 2502 (from Henkel) and ALKAMULS ® sorbitan esters SML, SMO, SMS, STO and ALKAMULS ® sorbitan ester ethoxylates PMSL-20 and PSMO-20 (from Alkaril Chemicals Ltd.) among others. A combination of sorbitan esters can also be used as described in a co-pending application Ser. No. 870,858 filed Apr. 20, 1992. The amount of surfactant must be such that a water-in-oil high internal phase emulsion will form. Generally, the surfactant is present in an amount effective to form a water-in-oil high internal phase emulsion (HIPE). Preferably, the surfactant can be present from about 2 to about 40% by weight, more preferably about 5 to about 25% by weight based on the monomers.

The relative amounts of the aqueous phase containing water and an electrolyte and monomer phase containing monomer mixtures used to form the high internal phase emulsions are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion (HIPE) typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase can preferably contain a water-soluble electrolyte to stabilize the HIPE and to make the foam more water wettable. Suitable electrolyte includes inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. Unless all of these factors are such that it favors formation of a water-in-oil emulsion, the emulsion will form a oil-in-water emulsion rather than water-in-oil high internal phase emulsion. The formation of a water-in-oil emulsion is described in U.S. Pat. No. 4,522,953, the disclosure of which is herein incorporated by reference.

In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about 5 $s^{-1}$, preferably at least about 10 $s^{-1}$ can be used to mix the water-in-oil emulsion. A larger mixer equipped with an impeller with a shear rate of at least about 10 $s^{-1}$ or a pin gap mixer with a shear rate of at least about 50 $s^{-1}$, preferably at least about 100 $s^{-1}$ can also be used. If the shear rate is too low, the water-in-oil emulsion will revert to a oil-in-water emulsion. It is desirable to at least have a water to oil ratio of about 9:1, preferably at least about 19:1, more preferably at least about 30:1 for a high absorbency capacity foam.

An HIPE can be prepared in batches or continuously. To form an HIPE in batches, the emulsion is formed in a vessel or a container by gradually adding an aqueous phase in a monomer mixture under moderate rate of shear until the desired water to oil ratio is reached.

An HIPE can be prepared continuously by initially preparing a preformed emulsion of approximately the same character as the desired emulsion by the method described above, then introducing into the preformed emulsion, both the aqueous phase and monomer phase of the emulsion in such proportions so as to produce the desired emulsion while maintaining the emulsified mass in a state of continuous shear sufficient to reduce the effective viscosity of the mass near to that of the introduced phase but not above the inherent shear stability point of the desired emulsion, and then withdrawing the prepared emulsion at the desired rate. The inherent shear stability point is where the emulsion coaleses due to excess mixing. Thus, the emulsion should not be mixed at excessively high shear because the emulsion may coalesce, if the shear is high enough, i.e., above the inherent shear stability point.

The aqueous phase and the monomer phase for batch process and continuous process can be introduced in a mixing vessel by an aqueous stream or a monomer stream, respectively, through one or more inlets. The streams can be combined prior to or after entering the mixing vessel then mixed in such a way to produce the desired HIPE. One of the stream can optionally contain an accelerator. The mixing vessel is any container in which the high internal phase emulsion is made regardless of the type of mixer or mixer head used.

From a different area of the mixing vessel than the inlets, at least a portion of the formed HIPE can be withdrawn (can also be continuous) to produce an emulsion stream and then the polymerization catalyst can be injected to the emulsion stream in a manner to distribute the polymerization catalyst evenly in the emulsion stream. The polymerization catalyst can be added neat, in water or in organic solvents for oil soluble catalysts or in another carrier as long as the final emulsion is adjusted for the additional water or such other carrier through one or more inlets to a tube carrying the HIPE stream or a vessel containing the withdrawn HIPE. It has been found that either oil-soluble catalysts or water-soluble catalysts can be added after the formation of the emulsion to form a substantially uniform curable water-in-oil high internal phase emulsion without coalescing.

It has been found that by adding the polymerization catalyst (i.e., initiator) after forming the HIPE according to the invention, any curing in the mixer that can cause processing difficulties can be avoided. In mixing HIPE in a continuous process, a portion of the emulsion can have long residence time compared to the onset of gelation (i.e., when viscosity is high enough that the portion of the emulsion will not to flow): thus, under the conventional methods it can be long enough to partially polymerize or gel a portion of the monomers. This residence time will depend on the mixer, viscosity of the emulsion and mixing temperature. Therefore, by adding the polymerization catalyst after producing the HIPE, processing difficulties such as clogging of the mixer or non-uniformity of the HIPE resulting from premature polymerization/curing can be avoided. Even process upsets in batch mixing process under the conventional methods problems including limited storage time, wall fouling on the mixing vessel, premature gelling in the mixing vessel or fouling the mixer head. Thus, the inventive process avoids these processing problems. Further, for a fast curing polymerization catalyst, premature gelling or fouling of the mixer head can be avoided by using the inventive process.

The added polymerization catalyst can also be further blended into the HIPE by any blending technique such as, for example, static mixer or a pin mixer at a low shear rate, to form a curable water-in-oil high internal phase emulsion. The rate of shear must be high enough to blend the catalyst but low enough not to allow the emulsion to coalesce or liquify. Such shear rate should be such that the catalyst-added emulsion (i.e, curable water-in-oil high internal phase emulsion) is at least blended sufficiently to form a substantially uniform emulsion but less than the inherent shear stability point.

The catalyst should preferably be blended (or mixed) such that the catalyst-added emulsion produces a substantially uniform foam product. The number of drops in a foam product which have diameters of about greater than 10 times the median drop size viewed under an electron microscope comprises preferably less than about 10% of a cross sectional area. The median drop size is the size of a drop for which one-half of the number of drops present have smaller diameters and one-half smaller diameters and than the size in a given cross sectional area.

It has also been found that when a surfactant with a low interfacial tension is used (eg. below about 1/10 dyne/cm) an impeller mixer is preferred. The inventive process is especially beneficial for an impeller mixer where the residence time of the emulsion is relatively long compared to a pin gap mixer.

The curable water-in-oil high internal phase emulsions (curable HIPE) can be cured in a batch process or in a continuous process. The emulsion or aqueous stream or monomer stream can be heated prior to or after the addition of the catalyst.

In a batch process, the curable HIPE is collected in a suitable container with a desirable shape and cured at a temperature at least about 25° C. for a time effective to polymerize and to cure the monomers. The HIPE is preferably polymerized and cured at a temperature within the range of about 25° C. to about 90° C., as long as the emulsion is stable at the curing temperature. Alternatively, a multiple-step process as described in a co-pending application Ser. No. 891,322, filed May 29, 1992 can also be used. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under suitable pressure to prevent water from boiling.

The emulsions can be heated, for example, by hot water, hot air, steam, IR, RF, microwave or ohmic heating. The HIPE should be cured until the desired properties are obtained. Typically, to obtain a cured foam, the HIPE should be cured for at least about 8 hours at 60° C. or at least about 1 hours at 60° C. then 3 hours at a temperature of above about 70° C. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

These foams can be post-cured to improve the foam properties. Better properties such as, for example, increased free swell (i.e., amount of liquid a foam can initially absorb), and/or good resistance to compression deflection (i.e., retention of liquid under load) can be obtained depending on the monomer formulation by post-curing the foam at a temperature of above about 75° C., preferably greater than 90° C. by steam, hot air or other heating source. Such heating may be performed initially in a heat exchanger, oven, over heated rollers or by other means.

When the temperature is near or above the boiling point of water, pressure is preferably applied to keep the water in the liquid phase and to obtain better properties. If desired, the pressure may be lowered to boil some of the water, but in normal practice the water will be maintained in the liquid state to stabilize the monomer :aqueous interface and retain the foam structure, at least until the foam is gelled (i.e., pre-cured), and preferably until it is cured. The use of pressure to maintain the aqueous phase in the liquid state allows very rapid curing of emulsions at very high temperatures, provided the emulsions are stable at the high temperatures used. Pressure can be applied to the emulsion, if desired, at a pressure generally from above atmospheric pressure, typically within the range of about atmospheric pressure to about 150 psig. When the temperature is about 100° C., a pressure from about 1 to about 10 psig is sufficient; when the temperature is about 130° C., a pressure from about 30 psig to about 70 psig is preferred. The preferred pressures will be from just above the autogenous steam pressure of the solution to about twice that pressure on an absolute pressure basis, i.e., psia; higher or lower pressures may be used as desired to achieve specific results.

One method to cure an emulsion under pressure is to use an autoclave operating under autogenous pressure of steam generated from pure water at a given temperature. Another satisfactory method is to use applied nitrogen or air pressure to prevent boiling of the emulsion. In case a permanent gas is used, an inert gas such as nitrogen or argon will be preferred over air or oxygen from a flammability point of view. The pressure may also be maintained by mechanical means, such as rollers, pistons, molds, or the like. This method will be particularly useful if continuous processing is desired.

Once the curing and/or post-curing process is completed, the water incorporated in the foam may be squeezed out, dried by heat or flashed by lowering the pressure to a suitable level to evaporate the remaining liquid to give the desired degree of dryness in the product foam. These drying techniques will preferably be used after the desired state of cure is developed in the foam material.

These foams prepared by the inventive process may be washed prior to, after or between drying stages to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high absorption capacities and good uniform properties especially suitable for use as liquid absorbent articles.

Illustrative Embodiment

The following illustrative embodiments describe the process of the invention and are provided for illustrative purposes and are not meant as limiting the invention.

Washing and Drying Method

The following washing and drying method was used for all of the examples below: After the foam blocks were cured, the blocks were sliced to 0.35 inches (0.89 cm) thickness. Then, each individual slice was placed on a 0.04 inch (0.1 m) mesh screen between a 9"×6.75" (22.9 cm×17.1 cm) stainless steel plate that allowed the slice to be squeezed to a 0.045 inch (1.14 mm) thickness. The squeezed slices were placed in an Arbor-press made by DAKE and the calcium chloride solution was squeezed out. The slices were then washed and squeezed twice by soaking the slices in 2 gallons of 1% calcium chloride solution and placing in the Arbor-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Rheometrics Dynamic Modulus

The measurements on the emulsions can be made by the following method. Rhometrics Dynamic Modulus can be measured on a Rheometrics RDS-7000 series mechanical spectrometer (any oscillatory dynamic tester which is capable of testing liquids in a couette fixture can be used) using a couette fixture, consisting of a cylindrical bob which rotates centered in a concentric cup (the bob has a conical end mating with a conical bottom on the cup). The samples are put into the cup after oil-wetting and drying the cup and the cup is placed so that the bob displaces the emulsion. The clearance between the bob and cup should be about 2 mm and the total sample less than 7 cc. A small amount of a low-volatility mineral oil TUFFLO ® 6056 (a hydrogenated mineral oil) is floated on top of the emulsion in the small annulus formed surrounding the bob. The measurements are made at high shear strain (typically 20%) at 4 discrete frequencies (0.1, 1, 10 and 100 radian/sec.) as a function of time after loading the cup. The sample is vibrated rotationally (dynamic mode) and the torque, rpm and normal force are recorded. The Rheometrics dynamic functions, G', shear modulus, G", loss modulus and tangent delta and ratio of G" to G' are measured. These data are plotted as a function of elapsed time. The technique of tracking of the dynamic moduli as a function of time at a temperature can be found in Encyclopedia of Polymer Science & Engineering, 1989, "Gel Point" by Heening Winter; and H. H. Winter, Polymer Engineering and Science, V27 #22, P1698 (1987).

Free Swell/Resistance to Compression Deflection

A 2"×2" (5.08×5.08 cm) square is cut from a foam slice. The foam square is soaked in warm 88° F (31° C.) Syn-Urine from Jayco for 17 minutes. From the 2×2" (5.08×5.08 cm) square, a circle of 1.129" (2 868 cm) diameter is cut. This disk is re-equilibrated in the Syn-Urine for 5 minutes. The wet disk is then weighed ("initial wet weight").

The disk is then placed under a 0.74 psi stress where stress is the total dead weight applied to the gage divided by the cross-sectional area. After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60°-70° C. and dried until the foam has fully expanded. The weight of the dry disk sample is then determined in grams ("final dry weight").

The following values were calculated from the above measurements.

Free swell=initial wet weight/final dry weight
Resistance to Compression Deflection (RTCD)=
wet weight after load at 15 minutes/final dry weight

Vertical Wicking Rate

From a foam slice, cut at 0.35 inches (0.89 cm) thickness, a 1 to 2 cm wide strip is cut, greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F (37° C.) so the bottom of the strip (0 mark) is barely touching the surface of the Syn-Urine (less than 1 mm). The Syn-Urine is dyed with food coloring to more easily monitor its absorption and rise in the foam. A stopwatch is used to measure the time required for the liquid level to reach 5 cm vertical height in the foam sample.

Percent Free Liquid

The amount of unabsorbed water was measured by decanting fluid from the foam in the container after pre-curing or curing stage and weighing the decanted fluid.

EXAMPLE 1

This example demonstrates preparation of a low density crosslinked polymeric material via a batch process according to the invention.

A mixture of 18.21% styrene, 27.19% divinyl benzene (commercial divinyl benzene containing 55% divinyl benzene from Aldrich Chemical Co.), and 54.6% 2-ethyl hexyl acrylate was filtered over a column of alumina. 17.579g of this filtered material was placed in a 1 liter beaker with 3.565 g Span ® 20 emulsifying agent (sorbitan monolaurate from Fluka Chemical Corp. or Aldrich Chemical Co.). Then, while stirring with a paint stirrer (model 06200 PM-70 made by SHUR-LINE ® Inc.) attached to an air motor (#C-1712 ½ hp motor made by Arrow Engineering Co.), 630 cc of aqueous 1.1% $CaCl_2$ solution was slowly added to the beaker over a period of 7 minutes. An emulsion formed with an desired water-to-oil ratio. One minute after the addition was complete, 1.6 g of potassium persulfate was added to the emulsion. The catalyst containing-emulsion was mixed with the same paint stirrer for 20 seconds operated at approximately 300-400 rpm. The beaker was placed in a 60° C. water bath for 18 hours. The foam was firm at this point.

A scanning electron micrograph of a cross section of the resulting foam was obtained. A grid of $150 \times 800$ micron cross section was placed across the photograph, and the median drop size was determined. Then, the fraction of the area of the photograph in large drops (10 or more times the median size) was determined. Less than 5% of the cross sectional area had large drop sizes.

EXAMPLE 2

This example demonstrates effect of mixing the polymerization catalyst into an HIPE.

A mixture of 18.15% styrene, 27.3% divinyl benzene (commercial divinyl benzene containing 55% divinyl benzene from Aldrch Chemical Co.), and 54.44% 2-ethyl hexyl acrylate was filtered over a column of alumina. 17.847 g of this filtered material was added to a 1 liter beaker containing 3.638 g of Span ® 20 emulsifying agent (sorbitan monolaurate from Fluka Chemical Corp. or Aldrich Chemical Co.). Then, while stirring with a paint stirrer (model 06200 PM-70 made by SHUR-LINE ® Inc.) attached to an air motor (#C-1712 ½ hp motor made by Arrow Engineering C 630 cc or an aqueous 1.1% $CaCl_2$ solution was slowly added to the breaker over a period of 9 minutes. An emulsion formed with the desired water-to-oil ratio. Then, 1.62 g of potassium persulfate was mixed into the emulsion. The contents of the beaker was then mixed four minutes with a Ross Mixer (model LAE-ME from Charles Ross & Son Company operated at approximately 3500 RPM). The contents of the beaker was then poured into 4 oz jars. Foam to liquid ratio was approximately 1:1. These jars were placed in a bath at 60° C., 80° C. and 100° C. After about 21 minutes, all foams in jars appeared to be firm with equal parts of solid and liquid (i.e., 50% free liquid).

A scanning electron micrograph of a cross section of the resulting foam was obtained. A grid of $150 \times 800$ micron cross section was placed across the photograph, and the median drop size was determined. Then, the fraction of the area of the photograph in large drops (10 or more times the median size) was determined. Greater than 80% of the cross sectional area had large drop sizes. The volume of these drops would be an even greater fraction of the total (since the volume goes as the cube of radius, and area as the square). Thus, the Ross mixer produces a very inhomogeneous foam, as a result of overmixing, for either oil or water soluble initiator, if the mixing is continues as long as 4 minutes.

As can be seen from Example 1 and Example 2 that the polymerization catalyst can be added after the formation of the HIPE without disturbing the emulsion uniformly by blending the catalyst in. However, care must be taken so that the blending will not be above the inherent shear stability point where the emulsion coalesces.

Comparative Example A

For comparison, a foam was made by dissolving potassium persulfate in water prior to emulsification.

Potassium persulfate (1.4 g) was added to 900 cc of a 10% $CaCl_2$ solution (399.1g calcium chloride diluted to with Barnstead (deionized) water) heated to 40° C. To this solution was added 29.90 g of a monomer surfactant mix (446.6 g styrene/447.3 g divinyl benzene/1353.1 g 2-ethyl hexyl acrylate/267.95 g Span ® 20) in a 1 liter plastic beaker. This mixture was stirred for approximately an additional minute with an air driven paint stirrer (model 06200 PM-70 made by SHUR-LINE ® Inc.). The resulting emulsion was split into two 3 pint plastic tubs AA & AB. Each tub was covered with a lid, then AA was cured for 24 hours in a 60 ®C incubator. Free liquid from the cured tub AA was measured at 6.2%. AB was cured for 4 hours in an Autoclave (9000-D rapid exhaust Autoclave made by NAPCO set at 134° C. and approx. 29 psi). Free liquid from the cured tub B was measured at 11.6%.

Properties of the polymeric product AA and the amounts of free liquids are shown in Table 1.

Scanning electron micrographs of a cross section of the resulting foam AA was obtained. A grid of $150 \times 800$ micron cross section was placed across the photograph, and the median drop sizes was determined. Then, the fraction of the area of the photograph in large drops (10 or more times the median size) was determined. Less than 5% of the cross sectional area had large drop sizes.

EXAMPLE 3

In each of the following runs $3a3h$, an emulsion was formed by slowly adding 20 g of a monomer surfactant mix (styrene/divinyl benzene/2-ethyl hexyl acrylate/-SPAN ® 20 weight ratio of 20:20:60:12) into 600 Cc of a 10% $CaCl_2$ solution (calcium chloride diluted with Barnstead water) at 40° C. in a 1 liter plastic beaker, while stirring with an air driven paint stirrer (model 06200 PM-70 made by SHUR-LINE ® Inc.) in a similar manner to Example 1. The stirring was continued for approximately a minute after the addition was complete. An emulsion formed with the desired water-to-oil ratio. The emulsion was poured into a 3 pint polyethylene tub.

In all the examples 0.9 g of potassium persulfate was added. In example 3a, potassium persulfate was sprinkled on the top of the emulsion. No additional stirring occurred. In example 3b, the potassium persulfate was added to the top of the emulsion, then an "X" was cut through the emulsion with a spatula. In example 3c, the potassium persulfate was added to the top of the emulsion, then four "X's" were cut through the emulsion with a spatula. In example 3d, the potassium persulfate was added to the top of the emulsion, then mixed with a spatula for 20 seconds. In example 3e, the potassium persulfate was added to the top of the emulsion, then mixed with the same paint stirrer as above for 30 seconds while moving the tub up and down and all around the stirrer. In example 3f, the potassium persulfate was added to the top of the emulsion, then mixed with the same paint stirrer for 10 minutes. In example 3g, the potassium persulfate was added to the top of the emulsion, then mixed with the same paint stirrer thoroughly through the emulsion for 1–2 minutes. The paint mixer was then placed around the bottom of the tub for an hour. In example 3h, the potassium persulfate was added to the top of the emulsion, then mixed with a Ross Mixer (model LAE-ME from Charles Ross & Son Company operated at approximately 3500 RPM) for 20 minutes.

The tubs containing the potassium persulfate added emulsions (curable emulsions) were covered and cured 24 hours in a 60° C. incubator.

Properties of these polymeric products and the amount of free liquids are shown in Table 1.

TABLE 1

| | % Free Liquid | RTCD (g/g) | Free Swell (g/g) | Vertical Wicking Rate(s) | Comments |
|---|---|---|---|---|---|
| Comp. Ex. AA | 7% | 15.7 | 19.2 | 200 | a |
| Ex. 3a | 86% | can't be tested. 14% remaining emulsion not cured | | | |
| Ex. 3b | 89% | can't be tested. 11% remaining emulsion not cured | | | |
| Ex. 3c | 64% | can't be tested. Some of remaining emulsion not cured, but some foam partly cured | | | |
| Ex. 3d | 17% | 9.1 | 22.4 | 210 | b |
| Ex. 3e | 23% | 8.1 | 18.0 | 327 | b |
| Ex. 3f | 7.6% | 11.1 | 21.2 | 226 | a |
| Ex. 3g | 7.7% | 12.3 | 15.7 | >600 | c |
| Ex. 3h | 64% | 6.0 | 6.6 | >600 | d | a: normal range
b: soft for normal
c: absorbency and vertical wicking rate hurt by overmixing
d: emulsion broken by overmixing Scanning electron micrographs of a cross section of the resulting foams for examples 3d–3f were obtained. A grid of 150 × 800 micron cross section was placed across the photographs, and the median drop sizes were determined. Then, the fraction of the area of the photograph in large drops (10 or more times the median size) were determined. Less than 5% of the cross sectional area had large drop sizes for foams 3d–3f.

Thus, the Ross mixer can be seen to produce a very inhomogeneous foam and degrade the emulsion (i.e., large amount of free liquid) as a result of overmixing (Example 3H). However, for from about 1 minute to about 10 minutes of paint mixer mixing, or for thorough stirring with a spatula, the drop size ratios and volume fraction observed in the electron micrographs and the amount of emulsion degraded is about the same as when the foam is made by the dissolving potassium persulfate in water first as seen in the Comparative Examples.

EXAMPLE 4

This example demonstrates effect of mixing another polymerization catalyst (oil soluble catalyst) into an HIPE according to the invention.

A mixture of 18.17% styrene, 27.23% divinyl benzene (commercial divinyl benzene containing 55% divinyl benzene from Aldrich Chemical Co.), and 54.6% 2-ethyl hexyl acrylate was filtered over a column of alumina. 17.48 g of this filtered material was added to a 1 liter beaker containing 3.63 g of Span ® 20 emulsifying agent (sorbitan monolaurate from Fluka Chemical Corp. or Aldrich Chemical Co.). Then, while stirring with a paint stirrer (model 06200 PM-70 made by SHUR-LINE ® Inc.) attached to an air motor (#C-1712 ¼ hp motor made by Arrow Engineering Co.), slowly added 630 cc or an aqueous 1.1% $CaCl_2$ solution over a period of 7 minutes. A high internal phase emulsion of desired water-to-oil ratio was formed. Then, 1.54 g of Lupersol DDM-9 (methyl ethyl ketone peroxide from Lucidol, a division of Penwalt Corp.) was added to the emulsion. The contents of the beaker was then mixed with the same paint stirrer for 20 seconds. The beaker was placed in a 60° C. water bath and left there for 16 hours. The foam was firm at this point.

We claim:

1. A process for the preparation of a porous crosslinked polymeric material comprising the steps of:
   (a) providing an aqueous stream comprising water and an electrolyte,
   (b) providing a monomer stream comprising a mixture of polymerizable monomers comprising at least one vinyl monomer and from about 2 to about 70 weight percent, based on the mixture, of a difunctional unsaturated crosslinking monomer,
   (c) providing a surfactant to the aqueous stream, the monomer stream, or both the aqueous and the monomer stream,
   (d) combining and mixing said aqueous stream and said monomer stream in a mixing vessel under conditions effective to produce a water-in-oil high internal phase emulsion having at least 90 weight percent, based on the emulsion, of water as the internal phase,
   (e) then adding to at least a portion of said water-in-oil high internal phase emulsion an effective amount of a polymerization catalyst to cure the polymerizable monomers thereby producing a curable water-in-oil high internal phase emulsion, and
   (f) then polymerizing the curable water-in-oil high internal phase emulsion at a temperature of at least about 25° C. for a time effective to cure the monomers.

2. The process of claim 1 in which the polymerization catalyst is present in an amount of about 0.005 to about 15 weight percent based on the polymerizable monomers.

3. The process of claim 2 in which the polymerization catalyst is a water-soluble catalyst.

4. The process of claim 2 in which the polymerization catalyst is an oil-soluble catalyst.

5. The process of claim 2 in which at least a portion of the water-in-oil high internal phase emulsion is withdrawn from the mixing vessel prior to the addition of the polymerization catalyst.

6. The process of claim 5 in which the polymerization catalyst is added to the said withdrawn water-in oil high internal phase emulsion.

7. The process of claim 2 in which the polymerization catalyst is added to the mixing vessel.

8. The process of claim 2 in which the vinyl monomer is selected from the group consisting of monoalkenyl arenes, acrylate or methacrylate esters, conjugated diolefins and mixtures thereof.

9. The process of claim 8 in which the difunctional unsaturated crosslinking monomer is selected from the group consisting of divinyl benzene, diethylene glycol dimethacrylate, 3-butylene dimethacrylate and allyl methacrylate.

10. The process of claim 9 in which the surfactant is selected from the group consisting of nonionic surfactants, cationic surfactants and anionic surfactants.

11. The process of claim 10 in which the water-in-oil high internal phase emulsion comprises as the internal phase, at least about 95 weight percent, based on the emulsion, of water.

12. The process of claim 11 in which the curable water-in-oil emulsion is cured in step (f) until at least 85% of the monomers are reacted.

13. The process of claim 12 in which the curable water-in-oil emulsion is cured in step (f) until at least 90% of the monomers are reacted.

14. The process of claim 13 in which the curable water-in-oil high internal phase emulsion is cured in batches.

15. The process of claim 13 in which the curable water-in-oil high internal phase emulsion is cured continuously.

16. The process of claim 1 in which the polymerization catalyst in step (e) is further blended under conditions effective to form a substantially uniform emulsion but less than the inherent shear stability point.

17. The process of claim 1 in which the polymerization catalyst in step (e) is further blended under conditions effective to form a substantially uniform porous crosslinked polymeric material.

18. A process for the preparation of a porous crosslinked polymeric material comprising the steps of:

(a) providing an aqueous stream comprising water and an electrolyte, (b) providing a monomer stream comprising a mixture of polymerizable monomers comprising at least one vinyl monomer and from about 2 to about 70 weight percent, based on the mixture, of a difunctional unsaturated crosslinking monomer, (c) providing a surfactant to the aqueous stream, the monomer stream, or both the aqueous and the monomer stream, (d) combining and mixing said aqueous stream and said monomer stream in a mixing vessel under conditions effective to produce a water-in-oil high internal phase emulsion having at least 90 weight percent, based on the emulsion, of water as the internal phase, (e) withdrawing at least a portion of said water-in-oil high internal phase emulsion from the mixing vessel, (f) then adding to the withdrawn water-in-oil high internal phase emulsion an effective amount of a polymerization catalyst to polymerize and cure the polymerizable monomers thereby producing a curable water-in-oil high internal phase emulsion, and (g) then polymerizing the curable water-in-oil high internal phase emulsion at a temperature of at least about 25° C. for a time effective to cure the monomers.

19. The process of claim 18 in which the polymerization catalyst is a water-soluble catalyst.

20. The process of claim 18 in which the polymerization catalyst is an oil-soluble catalyst.

* * * * *